United States Patent [19]
Dedek

[11] 3,790,374
[45] Feb. 5, 1974

[54] METHOD FOR FORMING ARTICLES FROM POWDERED METAL

[75] Inventor: Frank G. Dedek, Westland, Mich.

[73] Assignee: Burroughs Corporation, Detroit, Mich.

[22] Filed: Nov. 9, 1972

[21] Appl. No.: 305,062

Related U.S. Application Data

[62] Division of Ser. No. 54,971, July 15, 1970, Pat. No. 3,720,491.

[52] U.S. Cl.............. 75/208 R, 29/182.2, 75/214, 101/401.2, 101/401.5, 264/111
[51] Int. Cl......... B22f 3/16, B22f 3/24, B22f 5/00, B22f 7/00, B41c 1/00
[58] Field of Search . 75/214, 208 R, 221; 29/182.2; 101/401.2, 401.5; 148/126; 264/111

[56] References Cited
FOREIGN PATENTS OR APPLICATIONS
747,330  4/1956  Great Britain Primary Examiner—Carl D. Quarforth
Assistant Examiner—R. E. Schafer
Attorney, Agent, or Firm—Charles S. Hall

[57] ABSTRACT

A method and apparatus for forming a unitary article, such as a printing disk, from powdered metal wherein at least one given face of the article is required to have a preferred grain density. A die, complementary in area and configuration to the given face, is provided for forming the given face of said preferred grain density. The face-forming die is mounted within an aperture in the inner wall of a molding cavity wherein the aperture has an outlet on the cavity and is dimensionally greater than the face-forming die. A space is provided about the face-forming die for the accumulation of a disposable portion of compacted powdered metal of less than said preferred grain density, the space being partially bounded by surfaces around said face-forming die and sloping away therefrom to the walls of the aperture. Powdered metal is placed in the mold and forced against the face-forming die and into the provided space, thereby forming a unitary article having a preferred grain density at one or more given faces while simultaneously providing for the accumulation of the disposable portion of less dense metal which may be removed in subsequent operations. The molded article is sintered to relieve work-hardening and then restruck to insure said preferred grain density and to improve facial definition. The restruck article may be subjected to further heat-treating operations depending on the desired physical characteristics required of the finished article.

10 Claims, 11 Drawing Figures

PATENTED FEB 5 1974

METHOD FOR FORMING ARTICLES FROM POWDERED METAL

This is a division of application Ser. No. 54,971, now U.S. Pat. No. 3,720,491, July 15, 1970.

BACKGROUND OF THE INVENTION

The invention relates to powdered metallurgy and more specifically to a method and apparatus for forming a unitary article from powdered metal wherein a given face of the article, such as an indicia-bearing face on a printing disk, includes some configuration thereon and is required to have a preferred grain density.

The field of powdered metallurgy has grown rapidly over the last several years. Many unitary articles can now be mass-produced economically using the techniques of powdered metallurgy. The usual process steps where strength and durability are required include molding a unitary article under pressure, sintering the article, and then sizing or restriking. The process may include additional heat-treating or sintering operations.

Problems arise whenever the article is required to have one or more given faces of a preferred grain density. These problems are magnified whenever the given face includes some configuration or indicial means thereon. Since powdered metal is usually compacted across its thinnest dimension, particular problems arise when attempting to form relatively thin, flat objects having a given face of a preferred grain density along one of its thin edges.

Attempts to solve these problems have concentrated on various methods and directions of applying compaction pressure and not on any geometrical interrelationship between the forming surfaces.

Attempts to compact powdered metal in a direction perpendicular to a forming surface have frequently resulted in a poor overall grain density. In forming disclike objects, such as type wheels, a double press operation is usually employed wherein the pressure is applied to the top and bottom of the disc body. This results in a good body density, but relatively poor density at the given faces on the periphery of the article. This is due to the unfortunate fact that powdered metal does not readily flow or compact in a direction perpendicular to the direction of the applied force.

Other methods attempt the application of simultaneous axial and radial pressure but the compaction density at the given face does not provide sufficient strength, hardness and durability as required for many operations.

These problems become even more crucial when making printing discs having characters thereon which have line-width tolerances within the strict specifications required in some operations, such as those employing Magnetic Ink Character Recognition (MICR) techniques. In order to achieve this degree of facial grain density and definition, such printing disks are presently hand-made at great expense by engraving.

OBJECTS AND BRIEF SUMMARY OF THE INVENTION

In view of these problems it is an object of this invention to provide a process for molding a unitary article from powdered metal wherein at least one given face of the article has a preferred grain density.

It is a further object of this invention to provide a method for forming a unitary article, such as a printing disk, from powdered metal wherein the indicia-bearing surfaces or type faces of the printing disk have a preferred grain density.

It is still another object of this invention to provide an improved forming die and mounting means for use in and improved molding or restrike apparatus for forming a unitary article having at least one given face of a preferred grain density.

These and other objects and desirable features are achieved by a method and apparatus for molding a special configuration, such as a type face, onto a given face of an article, concommitantly with the formation of the article itself from powdered metal, the given face having a preferred grain density. A die, complementary in area and configuration to the given face, is provided for forming the given face, and die-supporting surfaces establish a space for the accumulation of compacted powdered metal of less than the preferred grain density. The space is formed about the given face and is partially bounded by surfaces sloping outwardly from the face and away from the cavity. The powdered metal is placed in the mold and forced against the face-forming die and into the established space thereby forming a unitary article having a preferred grain density at at least one given face. The accumulated portions of less densely compacted powdered metal may be removed in subsequent operations.

The present invention discloses a method and apparatus for making unitary articles from powdered metal. Such articles include type wheels or printing disks, and may include any article requiring a preferred grain density at a given face on the periphery thereof.

The article is formed as a unitary whole in a molding operation in which a given face having a preferred grain density is molded by a face-forming die dimensionally equivalent to the given face. A space around the face-forming die and partially bounded by tapered surfaces extending therefrom provides for the accumulation of less densely compacted powdered metal thereby insuring a proper fill and a preferred grain density at the given face. Powdered metal is placed in a molding cavity and pressure is applied to force the powdered metal to flow toward and compress against the face-forming die and the tapered surfaces partially bounding the provided space.

The molded article is removed and sintered at an appropriate temperature to relieve work-hardening. The given faces are then restruck to insure the attainment of the required grain density and to provide the necessary facial definition. The article may then undergo one or more heat treatments, possibly at sintering temperatures, to insure the desired final physical characteristics. The accumulated portions of less dense powdered metal formed about the given face may be removed by any suitable means, as by a trimming or grinding operation.

The following is a more detailed description of the preferred embodiment of the invention herein disclosed with specific reference to the above-mentioned drawings.

Figure 1:
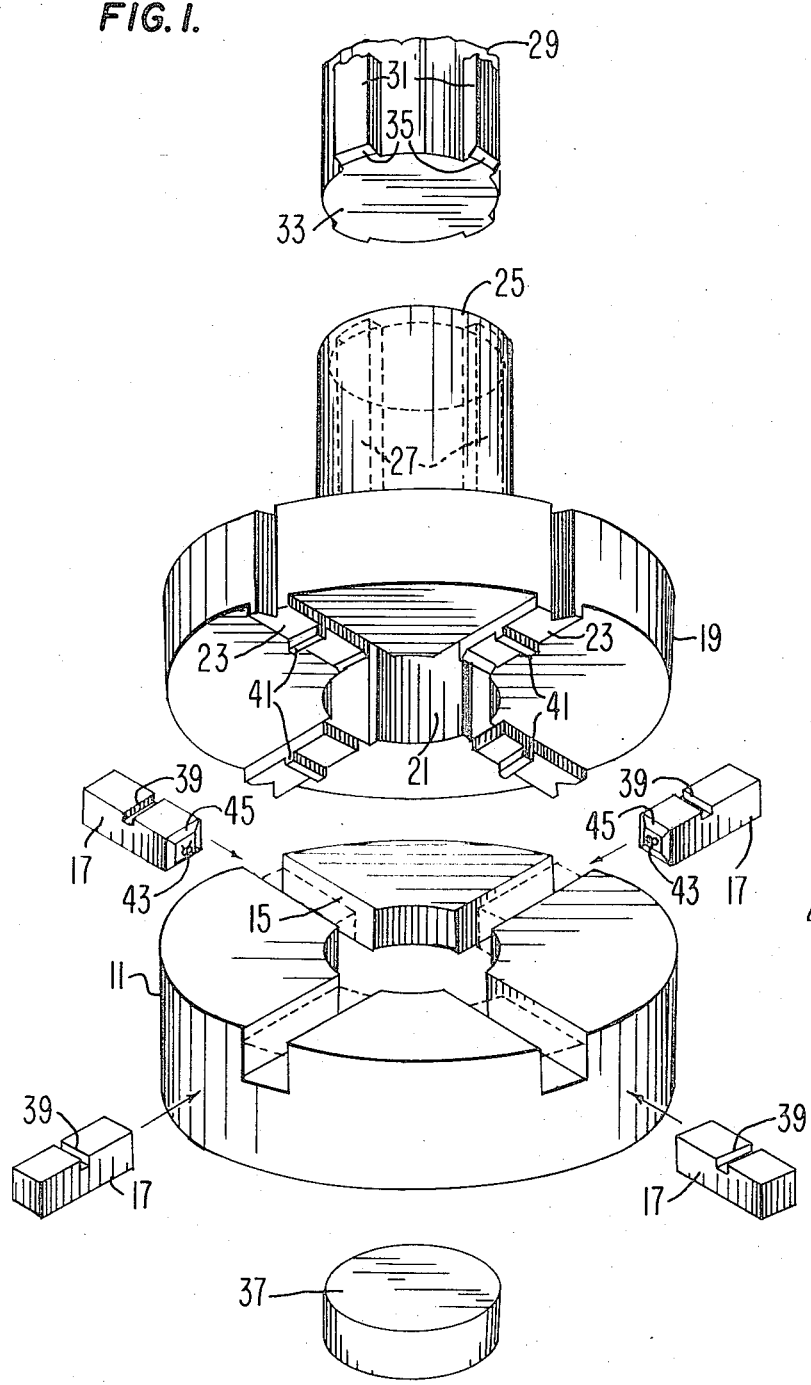
FIG. 1 is an exploded perspective view of a mold assembly embodying the present invention.

An exploded perspective of a die assembly or molding apparatus usable in forming a unitary article from powdered metal is shown in FIG. 1. A fixed lower mold 11 is provided with a central molding cavity 13 for receiving a predetermined charge of powdered metal. Spaced radially about the cavity are a plurality of channels or apertures 15 for receiving die-mounting elements 17.

A removable upper mold 19 has a central opening 21 which is dimensionally equivalent to the cross section of the molding cavity and is provided with a plurality of raised key portions 23 along its underside which extend radially from the opening. The upper mold is positionable over the lower mold so that opening 21 is directly over the molding cavity and the key portions 23 fit partially within the channels 15 thereby providing an upper bound to the channels, insuring proper alignment of the molds, and preventing rotational shifting between the two molds.

A ram-receiving collar 25 is mounted atop the upper mold 19 and is integral therewith. The collar surrounds the central opening 21 and the internal circumferences are dimensionally equivalent. Internal keyways 27 extend longitudinally along the inside of the collar and the walls of the opening for providing a plurality of continuous grooves from the top of the collar to the bottom face of the upper mold. A plunger or ram 29 is slidably positionable within the ram-receiving collar 25 and has axially aligned keys 31 about its periphery for slidably engaging the internal keyways 27 thereby insuring proper alignment and preventing rotation of the ram within the collar. The ram terminates in a compaction surface 33 which is dimensionally equivalent to the circumference of the molding cavity and each key terminates in a flow-directing surface 35 which extends from the surface of the key abutting the outermost wall of the keyway 27 and tapers radially toward the compaction surface 33.

Knockout 37 is positionable within the lower mold for providing a lower bound to the molding cavity 13 and for facilitating the ejection of the molded unitary article. A lower plunger or ram similar to ram 29 could be used instead of the knockout 37 if a double-press operation were used.

FIG. 1 also shows the die-mounting elements 17 and, in broken lines, the position of the die-mounting elements when inserted within the apertures 15. Each die-mounting element has a base or body portion and a forming tip. The body portions are dimensioned for closing the apertures 15 against the outward flow of powdered metal from the molding cavity and are provided with slots 39 cut laterally across their upper sides. Each of the radially extending key portions 23 on the underside of the upper mold 19 has a toe 41 transverse to its longitudinal dimension so that when the die-mounting elements are inserted within the channels 15 and the upper mold 19 is positioned over the lowered mold 11 with the axially extending key portions extending partially into the appropriate channels and against the inserted die-mounting elements, the toe 41 fits within the slot 39 and prevents the die-mounting element 17 from sliding within the channel.

The forming tip of each die-mounting element 17 has, at its base, the body portion of the element, and includes, at the opposite end, a substantially planar face mounting a face-forming die 43. The substantially planar face is dimensionally equivalent and complementary to the given face to be formed on the article. This substantially planar face with its face-forming die 43 is dimensionally smaller than the body portion of the die-mounting element 17 and tapering surfaces 45 join the substantially planar face to the body portion of the die-mounting element.

Figure 2:
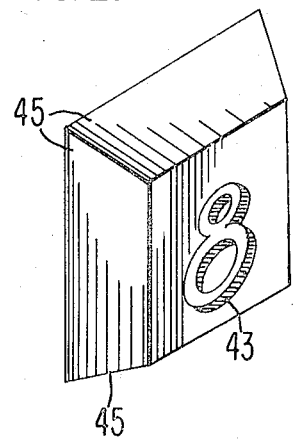
FIG. 2 is a perspective view of a forming tip of one of the die-mounting elements shown in the mold assembly of FIG. 1.

FIG. 2 more clearly illustrates the forming tip used in the preferred embodiment described herein. The face-forming die 43 is shown formed on the truncated face of a pyramid. The base of the pyramid is dimensionally equivalent to the body portion of the die-mounting element 17 of FIG. 1. The tapering surfaces 45 are the sloping surfaces forming the sides of the pyramid which taper from the base to terminate in the substantially planar truncated face bearing the face-forming die 43.

Figure 3:
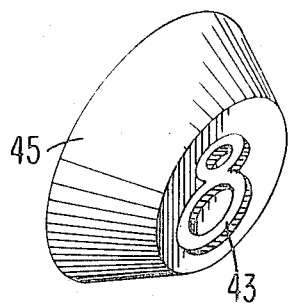
FIG. 3 is a perspective view of an alternate forming tip.

FIG. 3 shows an alternate forming tip wherein a face-forming die 43 is formed upon a truncated face of a cone and the tapering surfaces 45 are the sides of the cone.

Figure 4:
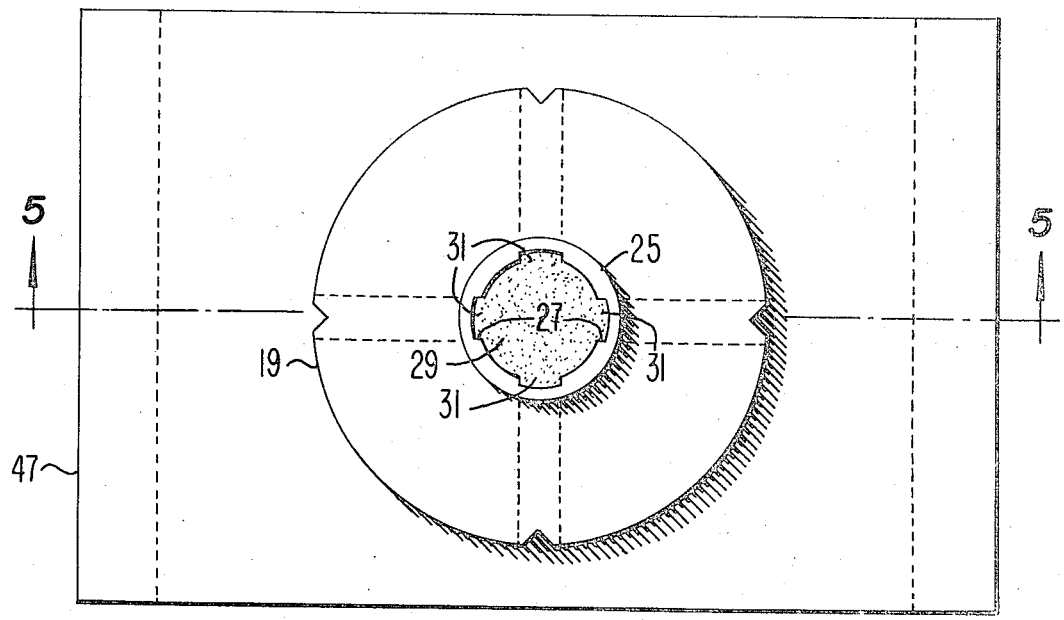
FIG. 4 is a top plan view of the mold assembly of FIG. 1.

FIG. 4 shows a plan view of the die assembly or mold of FIG. 1 in the closed position with the die-mounting elements 17 inserted within the apertures 15. Fixed lower mold 11 is mounted upon a base 47 and the removable upper mold 19 is secured thereover. Ram 29 has been inserted within the central opening of the upper mold and its axially aligned keys 31 are slidably positioned within the keyways.

Figure 5:
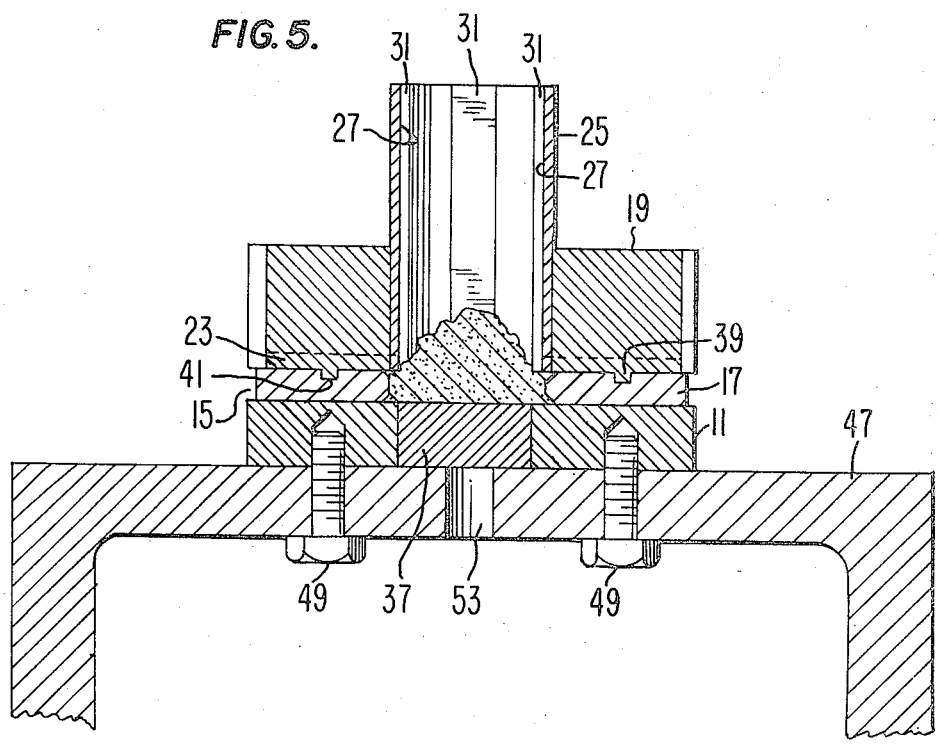
FIG. 5 is a cross-sectional view of the mold assembly of FIG. 4, taken on line 5—5 and shows the mold assembly with the ram removed and a charge of powdered metal inserted.

FIG. 5 is a sectional view taken through line 5—5 of FIG. 4 and shows the fixed lower mold 11 secured to base 47 by means of threaded screws 49. Knockout 37 has been inserted to close the bottom of the cavity and the die-mounting elements 17 have been inserted to close the channels of apertures 15 against the outward flow of powdered metal from the cavity 13. The removable upper mold 19 has been lowered to engage the fixed lower mold 11 and the radially extending key portions 23 are positioned into the top of the channels 15 and over the die-mounting elements 17 so that the toes 41 of the radially extending keys 23 fit within the slots 39 of the die-mounting elements thereby securing the die-mounting elements within the apertures or channels. The ram has been removed and a predetermined charge of powdered metal 51 has been inserted through the collar 25 and into the molding cavity 13. An opening 53 has been provided through the base 47 so that a knockout rod or similar means can be inserted to raise knockout 37 and eject the molded article.

Figure 6:
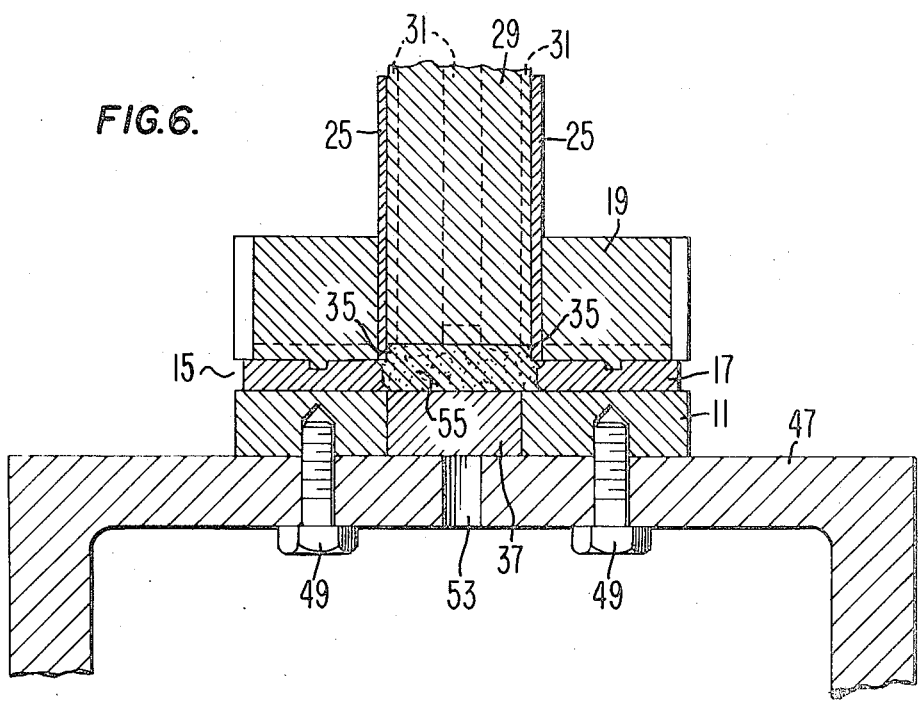
FIG. 6 shows the mold assembly of FIG. 5 with the ram in operating position.

After the die assembly has been closed and the charge of powdered metal 51 inserted into the molding cavity, the ram 29 is inserted into the collar 25 and is lowered under pressure. FIG. 6 shows the powdered metal 51 being compacted to form the unitary article of FIG. 8. As the ram descends, the lower compaction surface 33 contacts the powdered metal and begins to axially compress it to form the body portion of the article. The flow-directing surfaces 35 on the tapered ends of the axially aligned keys 31 of the ram force the powdered metal to flow toward the forming tip of the die-mounting elements 17. Although the degree of taper of sloping surfaces 45 and of flow-directing surfaces 35 may be adjusted as desired, the inventor has found a 45° slope to be quite satisfactory in forming printing disks.

Further pressure forces the powdered metal 51 to compact densely about the face-forming die 43 on the forming tip. While a portion of less densely compacted powdered metal accumulates in the space 55 partially bounded by the tapering surfaces 45 sloping from the substantially planar face of each of the die-mounting element to the channel-closing base portion of each of the die-mounting elements. After the unitary article is formed within the molding cavity the ram 29 is removed and the removable upper mold 19 is lifted. The die-mounting elements 17 may be moved radially away from the cavity 13 and a knockout rod or similar means may be inserted in the opening 53 to lift the knockout 37 and eject the molded article.

Figure 7:
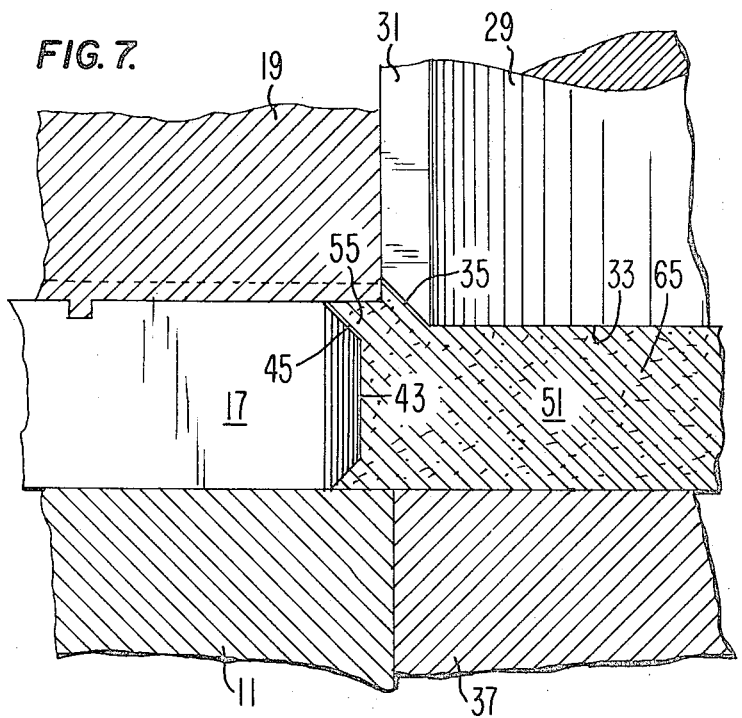
FIG. 7 is a detail view of a portion of the mold assembly of FIG. 5 where the ram forces the powdered metal about the tip of a die-mounting element.

FIG. 7 shows a detailed view of that portion of FIG. 6 where the ram 29 forces the powdered metal 51 to compact about the forming tip of the die-mounting elements 17. The powdered metal is being axially compacted by the compaction surface 33 while the flo-directing surface 35 guides the flow of the powdered metal toward the forming tip of die-mounting element 17. As the powdered metal is compacted it is forced to compact densely at the face-forming die 43 while a portion of less densely compacted powdered metal accumulates in the space 55 partially bounded by the tapering surfaces 45 and the walls of the apertures 15.

Figure 8:
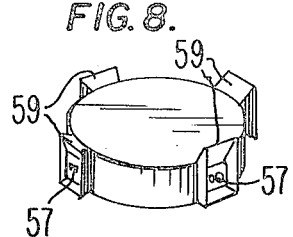
FIG. 8 is a perspective view of a printing disk produced in the molding assembly of FIG. 6.

The unitary molded article, after it has been ejected from the molding apparatus, is shown in FIG. 8. Indicia-bearing given face 57 which has a preferred grain density is surrounded by a disposable accumulation 59 of relatively less dense powdered metal.

Figure 9:
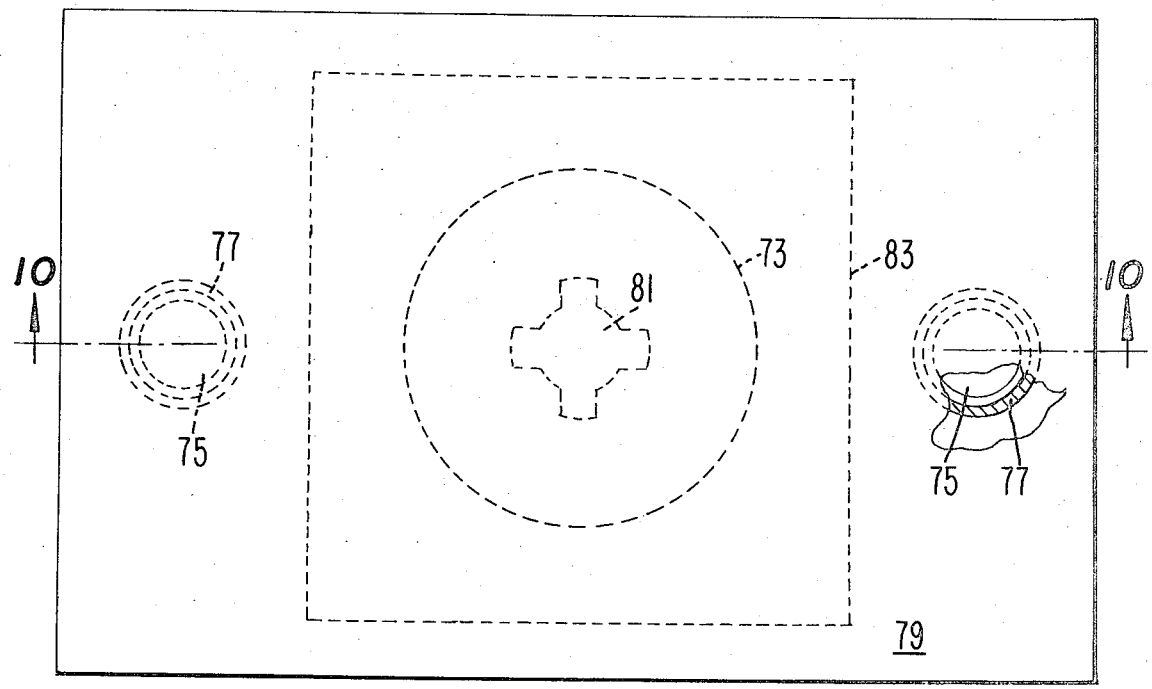
FIG. 9 is a top plan view of a restrike die assembly embodying the present invention.
Figure 10:
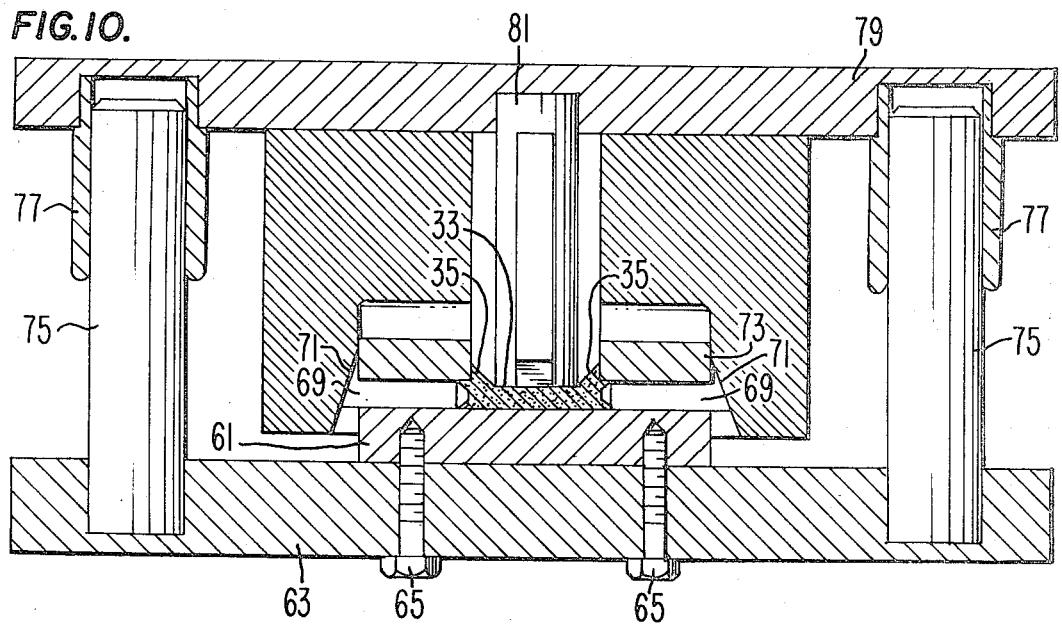
FIG. 10 is a cross-sectional view of the restrike assembly of FIG. 9 taken along line 10—10.

The molded article is sintered at a suitable temperature to relieve work-hardening and is then placed in a sizing or restrike die assembly as shown in FIGS. 9 and 10. FIG. 9 shows the top plan view of the restrike assembly. FIG. 10 is a cross sectional view of the restrike assembly of FIG. 9 taken along line 10—10 and looking in the direction of the arrows. A lower restrike mold 61 is secured to a restrike base 63 by means of threaded screws 65. The lower restrike mold has a central article-receiving chamber and a plurality of apertures of channels extending radially therefrom. The article-receiving chamber is dimensioned to receive the sintered article 67 and the article is positioned therein such that a given face of the article is aligned so as to coincide with the appropriately configured die-mounting restrike element 69. The die-mounting elements of the restrike apparatus are similar to the die-mounting elements 17 and the molding apparatus of FIG. 1 except that the toes 41 are absent, and opposite the forming tip, the base of the die-mounting element terminates in a cam surface or cam end 71. Die-mounting elements 69 are radially slidable within the channels.

An upper restrike mold 73, similar to the removable upper mold 19 of the molding apparatus of FIG. 1, is shown positioned over the lower mold 61. The base 63 is equipped with guide posts 75 whose upper ends reside slidable within guide collars 77 of a pressure plate 79. The pressure plate has attached thereto a holding ram 81, similar to the ram 29 of FIG. 1, and a cam ring 83 having cam surfaces 85 engagable with the cam ends 71 of the die-mounting elements 69 for sliding them radially toward the article-receiving chamber of the lower mold.

The article is inserted within the article-receiving chamber of the lower restrike mold 61 and appropriately aligned before the upper restrike mold 73 is lowered. As the pressure plate 79 descends and is guided in its downward movement by the guide posts 75 sliding within the guide collars 77, the holding ram 81 engages the sintered article 67 securing it within the chamber. The cam surfaces 85 of the cam ring 83 engage the cam ends 71 of the die-mounting elements 69 and drive them radially inward so that the face-forming dies engage the appropriate given faces of the sintered article to insure the proper facial definition and the preferred grain density.

After the restrike operation, the article may be subjected to one or more heat operations, perhaps to sintering temperatures, depending on the physical characteristics required of the finished article. Portions of accumulated powdered metal of less than said preferred grain density may be removed by any suitable means as by a trimming or grinding operation.

Figure 11:
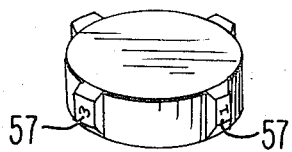
FIG. 11 is a perspective view of an article produced in the assembly of FIG. 10 after the excess portions have been removed.

The printing disc, after less dense accumulations 59 have been removed from about its indicia-bearing faces 57, is shown in FIG. 11.

Although a specific apparatus has been shown for the purpose of describing applicant's method for forming unitary articles from powered metal, it will be apparent to those skilled in the art that other variations in the specific structures illustrated and the specific article formed by the process may be made without departing from the spirit and scope of the invention which is limited only by the appended claims.

What is claimed is:

1. In the art of fabricating a unitary article from powdered metal in a die apparatus having a molding cavity, the method of improving grain density in a selected face of the article formed by a die in said die apparatus comprising the steps of:

providing space around said die for accumulation of disposable, less densely compacted powdered metal, said space being partially bounded by surfaces flaring away from said die and outwardly from said molding cavity, filling said molding cavity with a predetermined charge of powdered metal, pressing said powdered metal against said die and obliquely against said sloping surfaces for compacting said powdered metal to form a preferred grain density in said selected face and a less than preferred grain density in said surrounding space, and removing said disposable accumulation of less densely compacted powdered metal.

2. The method of claim 1 wherein said pressing step includes applying positive pressure along only one axis of said article.

3. The method of claim 2 wherein said step of applying positive pressure along only one axis of said article includes applying unidirectional pressure parallel to the plane of said selected face.

4. The method of claim 1 including the step of sintering said article following said step of pressing said powdered metal.

5. The method of claim 4 wherein said sintering step is followed by the step of restriking said selected face to insure said preferred grain density and to improve facial definition.

6. The method of claim 5 wherein said step of restriking is followed by heat-treating said article at least once.

7. A method of fabricating from powdered metal a unitary printing disk having indicia-bearing surfaces of a preferred grain density about the periphery thereof, comprising the steps of:

providing dies on the truncated face of pyramids, mounting said truncated pyramids in the wall of a circular mold, the die-bearing faces and sloping surfaces of the pyramid having access to said mold, filling said mold with a predetermined amount of powdered metal, forcing said powdered metal against said dies wherein compacted powdered metal having a preferred grain density forms against said truncated die-bearing face and compacted powdered metal having a less desirable grain density accumulates as excess against the sloping surfaces of said truncated pyramids, and removing said less desirable excess from about said indicia-bearing surfaces to form a printing disk.

8. The method of claim 7 wherein said forcing step is followed by sintering the unitary disk to relieve work-hardening 9. The method of claim 8 wherein said sintering step is followed by the step of restriking said indicia-bearing surfaces to insure sufficient definiation and said preferred grain density.

10. The method of claim 9 wherein said restriking step is followed by at least one heating operation.

* * * * *